June 24, 1924.
J. S. PEDEN
1,498,671
VISION SHIELD FOR VEHICLES
Filed March 16, 1923
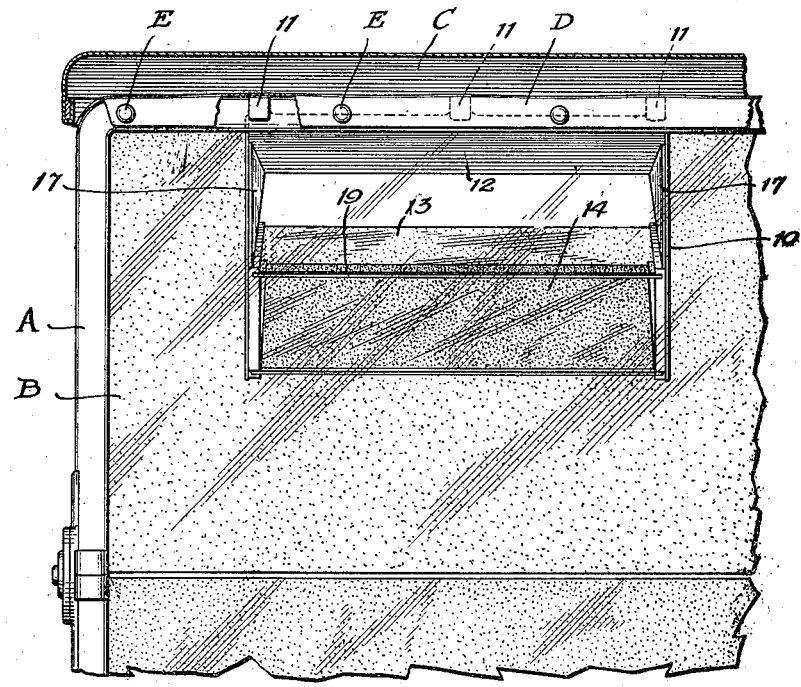
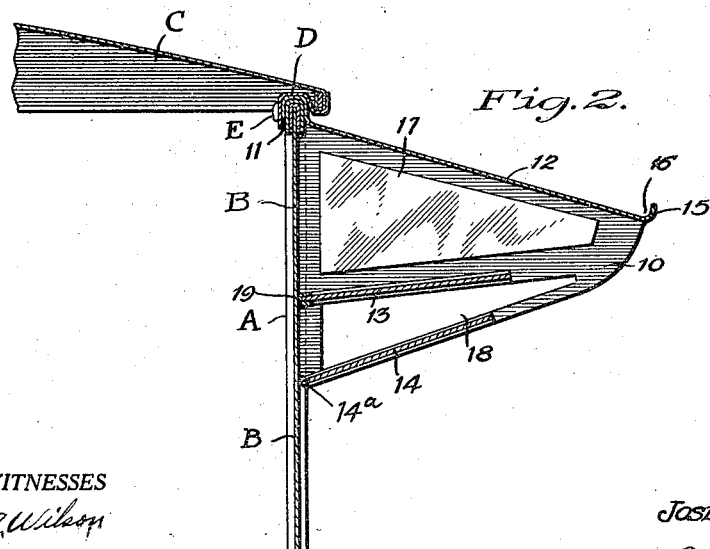
WITNESSES
INVENTOR
JOSEPH S. PEDEN
BY
ATTORNEYS Patented June 24, 1924.

1,498,671

UNITED STATES PATENT OFFICE.

JOSEPH S. PEDEN, OF NEW YORK, N. Y.

VISION SHIELD FOR VEHICLES.

Application filed March 16, 1923. Serial No. 625,547.

*To all whom it may concern:*

Be it known that I, JOSEPH S. PEDEN, a citizen of the United States, and a resident of the city of New York, borough of Manhattan, in the county and State of New York, have invented a new and Improved Vision Shield for Vehicles, of which the following is a full, clear, and exact description.

This invention has relation to a vision shield which is adapted for use on the wind shield of an automobile, the window of a locomotive cab, vestibule window of a street car, or on any other vehicle or structure of this character whereby a portion of the wind shield or window is protected against the collection of rain, snow, sleet or other vision obscuring elements to afford the driver of the vehicle a clear and unobstructed view of the road in advance of the vehicle.

As a further object the invention contemplates a vision shield which is adapted to extend forwardly from the wind shield or window of the vehicle in line with the driver's eyes to define with said wind shield a hood having an open front end producing a dead air space, and means immediately adjacent said open forward end for deflecting rain, snow, sleet or other vision obscuring elements from entering said open end due to the forward motion of the vehicle.

As a still further object the invention contemplates a vision shield of the character set forth which is extremely simple in its construction, inexpensive to manufacture and readily applicable to or removable from the wind shield or window of the vehicle.

With the above recited and other objects in view, the invention resides in the novel construction set forth in the following specification, particularly pointed out in the appended claims and illustrated in the accompanying drawing, it being understood that the right is reserved to embodiments other than those actually illustrated herein to the full extent indicated by the general meaning of the terms in which the claims are expressed.

In the drawing—

Figure 1 is a fragmentary transverse sectional view through an automobile with a vision shield constructed in accordance with the invention in applied position.

Fig. 2 is a fragmentary longitudinal sectional view through the vehicle and through the vision shield.

For the purpose of illustrating one use or adaptation of the invention, the same is shown as attached to the wind shield of an automobile of standard construction, and in the drawing A represents the wind shield frame, B the transparent or glass panel thereof, C the top of the vehicle, D the flap which is attached to the upper rail of the wind shield by snap fasteners or buttons E. The vision shield which constitutes the invention includes a framework 10 which is provided at its upper rear end with hooks 11 which are designed to engage over the upper rail of the wind shield and under the flap D. It is of course understood that other suitable means for attaching the framework to a wind shield or window of other vehicles may be employed in lieu of said hooks. The vision shield framework 10 supports an upper panel 12 which extends forwardly and preferably downwardly at an angle from the wind shield. An intermediate panel 13 extends forwardly and upwardly from the wind shield and at an angle thereto, and a lower panel 14 subterposed to the panel 13 extends forwardly and upwardly from the wind shield at a slightly greater angle than the panel 13. The forward edge of the upper panel 12 is turned upwardly as at 15 to provide a drain gutter 16 which discharges beyond the opposite sides of the panel any water or moisture which collects on the upper surface of said upper panel. The forward edge of the intermediate panel 13 is disposed a sufficient distance below the forward edge of the upper panel to provide a viewing space for the operator of the vehicle. The sides of the upper and intermediate panels are closed by a side wall or panel 17 whereby the panels 12, 13 and 17 together with the wind shield glass B define a dead air space. The forward edge of the lower panel is spaced below the forward edge of the intermediate panel and in view of the fact that no side panels or walls are provided, openings 18 induce a down draft adjacent the forward open end of the dead air space whereby rain, snow, sleet, or other vision obscuring particles are drawn by the down draft and prevented thereby from entering the dead air space and settling on the wind shield in line with the viewing space. The rear edge of the framework rests directly against the wind shield glass B and the rear edge of the intermediate panel is provided with a yieldable gasket 19 which impinges against the wind shield glass in order to seal the dead air space at its rear end. The lower panel 14 is preferably slightly spaced from the wind shield glass, as indicated at 14ª, to allow for the drainage of any moisture which collects thereon. It is of course understood that the panels 12, 13, 14 and 17 may be of any material, but in practice it is preferable to construct the upper panel 12 of a non-transparent material while the remaining panels may preferably be of glass or any other transparent material.

In use, when the vision shield is applied as illustrated the forward motion of the vehicle in a storm will, due to the down draft creating means below the dead air space, deflect the rain, sleet, snow or other vision obscuring particles from the forward open end of the shield to prevent their entrance into the dead air space and subsequent settling on the wind shield glass or window of the vehicle. This will serve to afford a clear and unobstructed vision of the road in advance of the vehicle through the viewing space at all times. When not needed the vision shield may readily be removed and stored in the vehicle or garage.

I claim:

1. A vision shield for vehicles consisting of upper, lower and side walls adapted to be positioned on the exposed side of a wind shield or window of a vehicle to define together with said wind shield or window a compartment having a restricted open front end affording a dead air space, and a subterposed wall spaced from the lower wall of the hood and the lower edge of the side walls to provide means upon forward movement of the vehicle for creating a down draft to deflect and prevent vision obscuring elements from entering the restricted open front of said compartment.

2. A vision shield for vehicles comprising a hood consisting of upper, lower and intermediate panels, side panels extending from the opposite side edges of the upper wall to the opposite side edges of the intermediate wall whereby to define a compartment adapted to be closed at its rear end by the exposed side of a wind shield or window of a vehicle to produce a dead air space, the intermediate and lower panels defining together with said wind shield or window a means for creating a down draft adjacent the forward open end of said compartment for deflecting and preventing the entrance of vision obscuring elements into the open end of the upper compartment.

JOSEPH S. PEDEN.